Patented Dec. 4, 1934

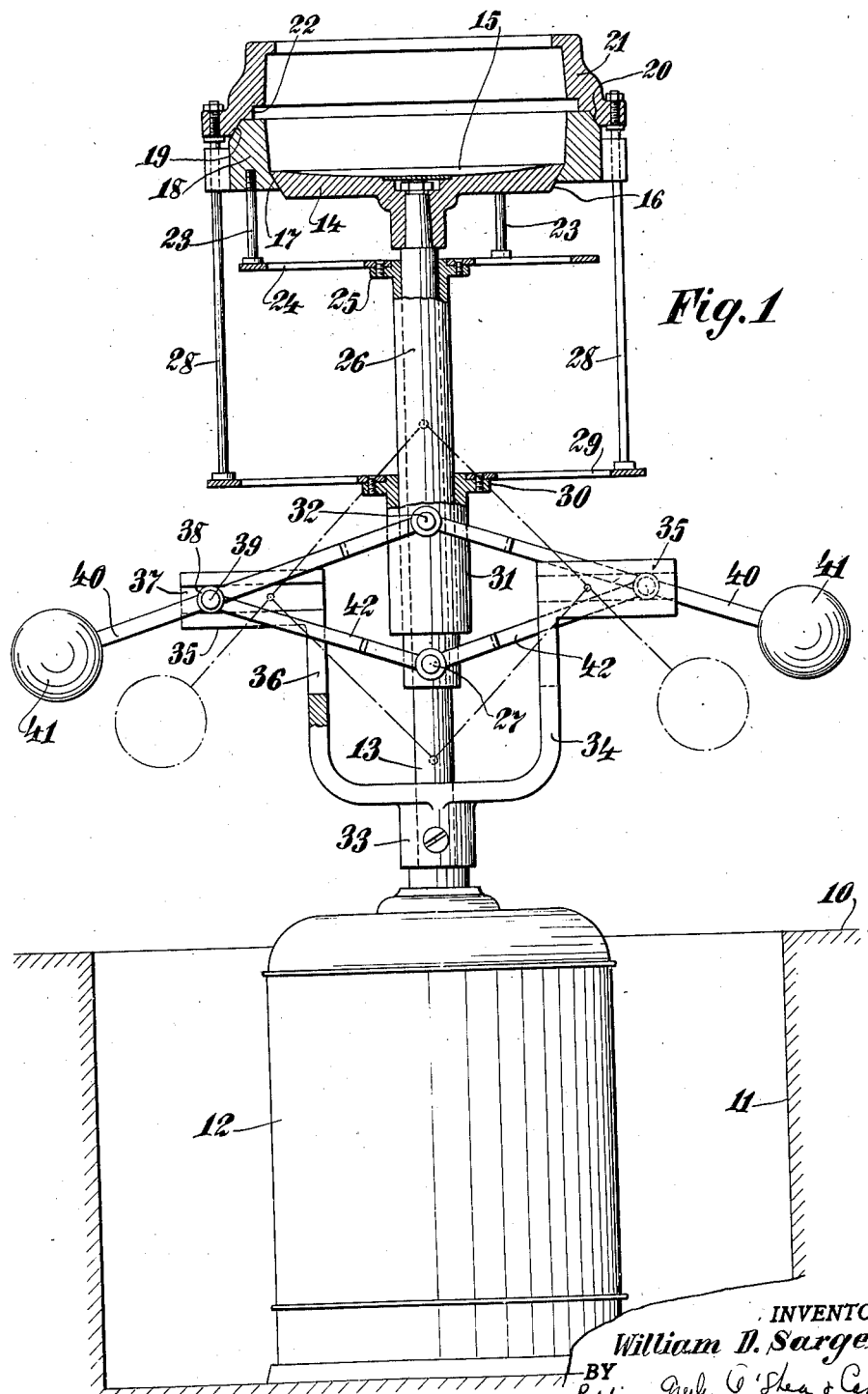

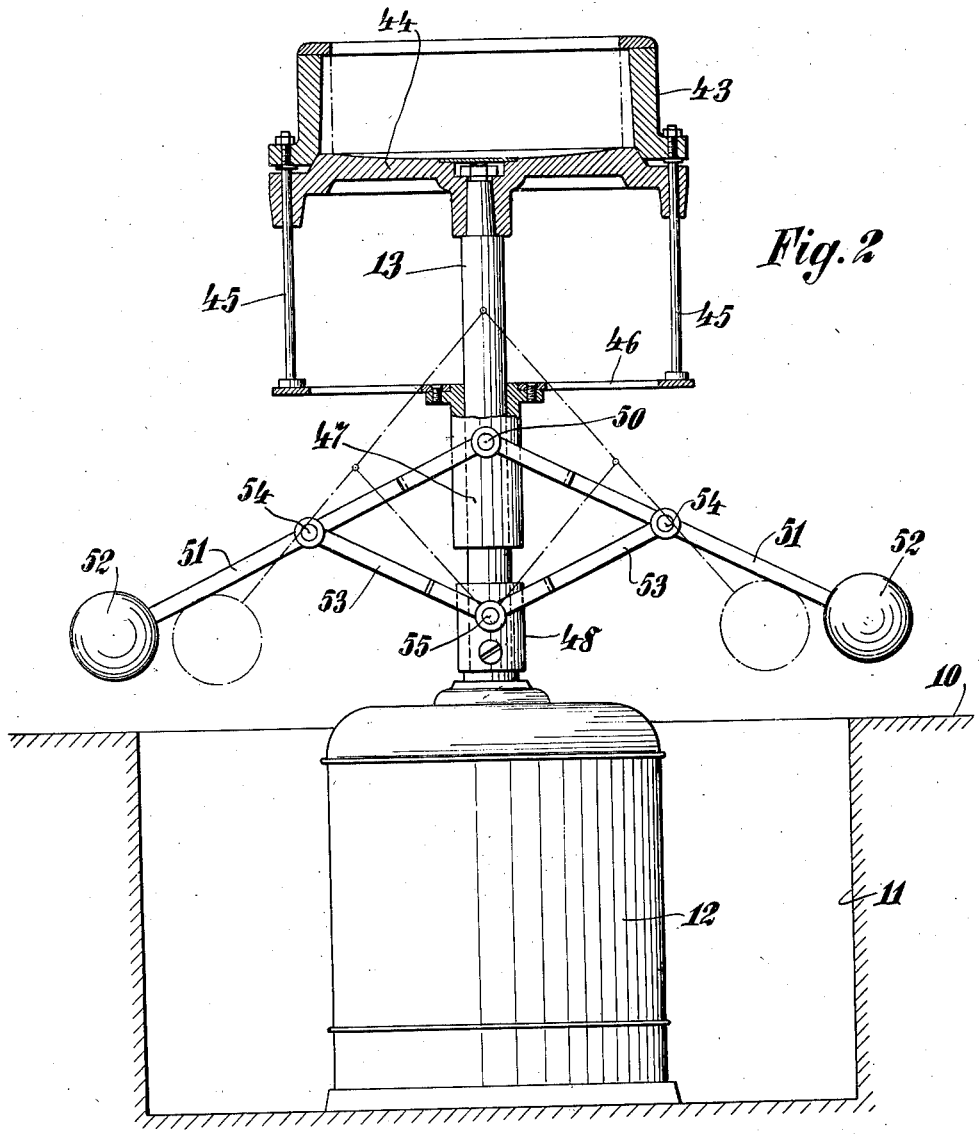

1,983,146

UNITED STATES PATENT OFFICE 1,983,146

SPEED CONTROLLED STRIPPING MOLD

William D. Sargent, New York, N. Y., assignor, by mesne assignments, to Durafer (Inc.), Dover, Del., a corporation of Delaware Application August 1, 1931, Serial No. 554,523

8 Claims. (Cl. 22—65)

The present invention relates to molding machines and embodies, more specifically, a molding machine for casting bodies centrifugally, means being provided to enable the mold to be stripped effectively from a casting after the metal in the mold has hardened.

In applicant's copending application, Ser. No. 555,464 filed August 6, 1931, a molding machine has been illustrated by means of which annular objects may be cast centrifugally. In the foregoing machine, the elements of the mold are stripped from the casting by a manual operation which, in the form illustrated, comprises the depressing of a treadle. In accordance with the present invention, the elements of the mold are automatically stripped from the casting and manual operation of such elements is completely eliminated. As a result, the manual operation required for supervising the molding machine is reduced to a minimum and a considerable saving and increase of efficiency results.

An object of the invention, accordingly, is to provide a molding machine for molding articles centrifugally, the molding elements being stripped from a casting after the same has been formed.

A further object of the invention is to provide a machine of the above character wherein the positions of the mold sections are controlled by a mechanism which is responsive to the speed of rotation of the mold.

A further object of the invention is to provide a machine having sections of the above character which are automatically stripped from a casting upon a decrease in the speed of rotation of the mold.

A further object of the invention is to provide a machine of the above character wherein the molding elements are automatically closed by the speed of rotation of the mold.

A further object of the invention is to provide a molding machine of the above character wherein the only manual supervision required for the machine comprises the controlling of the speed of the rotatable mold.

Further objects, not specifically enumerated above, will be apparent as the invention is described in greater detail in connection with the accompanying drawings, wherein:

Figure 1 is a view in vertical section, taken through the axis of a mold constructed in accordance with the present invention and showing the speed controlled mechanism for opening and closing the mold sections.

Figure 2 is a view similar to Figure 1, showing a mold constructed to mold annular articles, the exterior surface of which has no reverse curves whereby the article may be formed with a slight draft to permit the entire mold to be stripped therefrom as a unit.

With reference to Figure 1, a mold foundation is illustrated at 10 as formed with a recess 11 within which an electric motor 12 or other suitable power source is mounted. The power shaft 13 of the motor extends upwardly and a pouring plate 14 is fixed thereto. The upper surface 15 of the pouring plate is concave and the outer periphery 16 of the plate is tapered to provide a seat against which a tapered lip 17 of a lower mold section 18 engages to form a fluid tight joint. The outer periphery at the upper extremity of the lower mold section 18 is tapered at 19 to receive a cooperating tapered surface 20 on an upper mold section 21. The interior surface of the upper and lower mold sections 18 and 21 may be suitably formed to provide castings of the desired profile and in the form shown herein, these surfaces are formed to provide an annular liner for a brake drum in which a circumferential rib is provided by the annular recess 22 between the upper and lower sections 18 and 21.

The lower mold section 18 is mounted upon a plurality of rods 23 which are secured to a carrier 24. The carrier is mounted upon a flange 25 formed upon a sleeve 26 which is splined to the rotatable power shaft 13. The lower end of sleeve 26 is provided with a trunnion or trunnions 27 which effect the axial movement of the sleeve 26 in a manner to be described hereinafter.

The upper mold section is secured to rods 28 which are mounted upon an annular carrier 29, secured to flange 30 upon sleeve 31. Sleeve 31 is formed with a trunnion or trunnions 32 to move the sleeve 31 axially in a manner to be described presently.

Upon the power shaft 13 is fixed a sleeve 33 which is formed with oppositely extending arms 34 carrying outwardly projecting guide arms 35. The arms 34 are bifurcated, slots 36 spacing the bifurcations. In the outwardly extending guide arms 35, opposed grooves 37 are formed for receiving rollers 38 which are journaled upon heads 39. Heads 39 are secured to arms 40, intermediate the ends of the latter. The outer extremities of arms 40 carry suitable weights 41 while the inner ends are journaled upon the trunnions 32. For this purpose, the inner ends are bifurcated and the sleeve 31 is thus positioned between the respective bifurcations.

Arms 42 are pivoted at their outer extremities to the heads 39 and the inner extremities thereof are preferably bifurcated and journaled upon the trunnions 27. In this manner the heads 39 may move in planes at right angles to the axis of the shaft 13 and the weights 41, when moved upwardly due to an increase in the speed of rotation of power shaft 13, cause the upper and lower mold sections to be closed, as shown in Figure 1. When the speed of rotation of the mold decreases, the weights fall back into the position indicated in dot and dash lines in Figure 1 and the mold sections are separated. In this fashion, the control of the electric motor 12 automatically controls the mold closing and stripping operations and the operation of the machine is greatly facilitated.

In the construction shown in Figure 2, the mold is formed as a unit and is indicated at 43. A pouring plate 44 is secured to the power shaft 13 and is rotated therewith. The mold 43 is mounted upon rods 45 which are secured to a carrier 46, mounted upon sleeve 47. The sleeve 47 is slidably mounted upon the power shaft 13 and is formed with trunnions 50. Bifurcated arms 51 are journaled upon trunnions 50, the outer ends of the arms carrying weights 52. Intermediate the ends of arms 51, links 53 are pivoted as at 54. The adjacent ends of the links 53 are journaled upon trunnions 55 which are mounted upon a sleeve or collar 48 which may be secured to, or formed on the power shaft 13.

The operation of the mechanism shown in Figure 2 will be readily apparent inasmuch as the weights 52 will be elevated upon an increased speed of rotation of power shaft 13 until the mold 43 engages the pouring plate 44. After the pouring operation has taken place, the speed of rotation of the power shaft is decreased and the weights 52 fall. Upon movement of the weights 52 into the position indicated in dot and dash lines, the mold 43 will be elevated from the pouring plate 44 and effectively stripped from the casting.

It will thus be seen that a simple molding machine has been provided in which the mold sections are effectively stripped from the castings by means of the speed control mechanism described. The centrifugal force of the weights is adequate to maintain the mold sections in closed position and is likewise adequate to separate the mold sections from the casting and facilitate the removal from the latter.

While the invention has been described with specific reference to the accompanying drawings, it is not to be limited, save as defined in the appended claims.

I claim as my invention:

1. A centrifugal casting apparatus comprising a rotatable pouring plate, circular mold sections rotatable therewith, and means responsive to the speed of the pouring plate to space the sections from each other and from the pouring plate.

2. A centrifugal casting apparatus comprising a rotatable horizontal table, a molding element rotatable therewith and coaxial thereto, and means responsive to the speed of the rotatable table to move the molding element axially downward relative to the table.

3. A centrifugal casting apparatus comprising a rotatable horizontal table, coaxial circular mold sections rotatable therewith, and means responsive to the speed of the rotatable table and mold sections to move the sections axially in opposite directions.

4. A centrifugal casting apparatus comprising a rotatable horizontal table, coaxial mold sections rotatable therewith, and means responsive to the speed of the rotatable table to space one of the sections axially above and the other below the table.

5. A centrifugal casting apparatus comprising a vertical power shaft, a pouring plate on the shaft, a molding element on the plate, weighted arms pivoted intermediate their ends upon arms pivoted upon the shaft whereby the arms rotate with the shaft, and means connecting the adjacent ends of the weighted arms to the molding element to elevate the same from the plate upon decrease in speed of the shaft.

6. A centrifugal casting apparatus comprising a vertical power shaft, a pouring plate on the shaft, mold sections upon opposite sides of the plate and movable coaxially with respect thereto, a sleeve on the shaft connected to the lower mold section, a sleeve on the shaft connected to the upper mold section, weighted arms pivoted upon the last named sleeve, and arms pivoted intermediate the ends of the first arms and upon the first sleeve.

7. A centrifugal casting apparatus comprising a vertical power shaft, a pouring plate on the shaft, mold sections upon opposite sides of the plate and movable coaxially with respect thereto, a sleeve on the shaft connected to the lower mold section, a sleeve on the shaft connected to the upper mold section, weighted arms pivoted upon the last named sleeve, arms pivoted intermediate the ends of the first arms and upon the first sleeve, guide arms mounted to rotate with the power shaft, and means to mount the connection between the arms slidably upon the guide arms.

8. A centrifugal casting apparatus comprising a rotatable horizontal table, a vertical rotatable shaft secured thereto, a molding element rotatable therewith and coaxial thereto, a sleeve slidable on said shaft, means connecting said sleeve to said molding element, arms pivotally secured to said sleeve extending downwardly and carrying inertia weights at their extremities, and means connecting the central portion of said arms to said shaft, whereby said sleeve and molding element is moved downwardly by centrifugal force upon rotation of said shaft, sleeve, and inertia weights.

WILLIAM D. SARGENT.